March 17, 1942.  C. COTTA  2,276,467
GOVERNOR
Filed Jan. 2, 1940
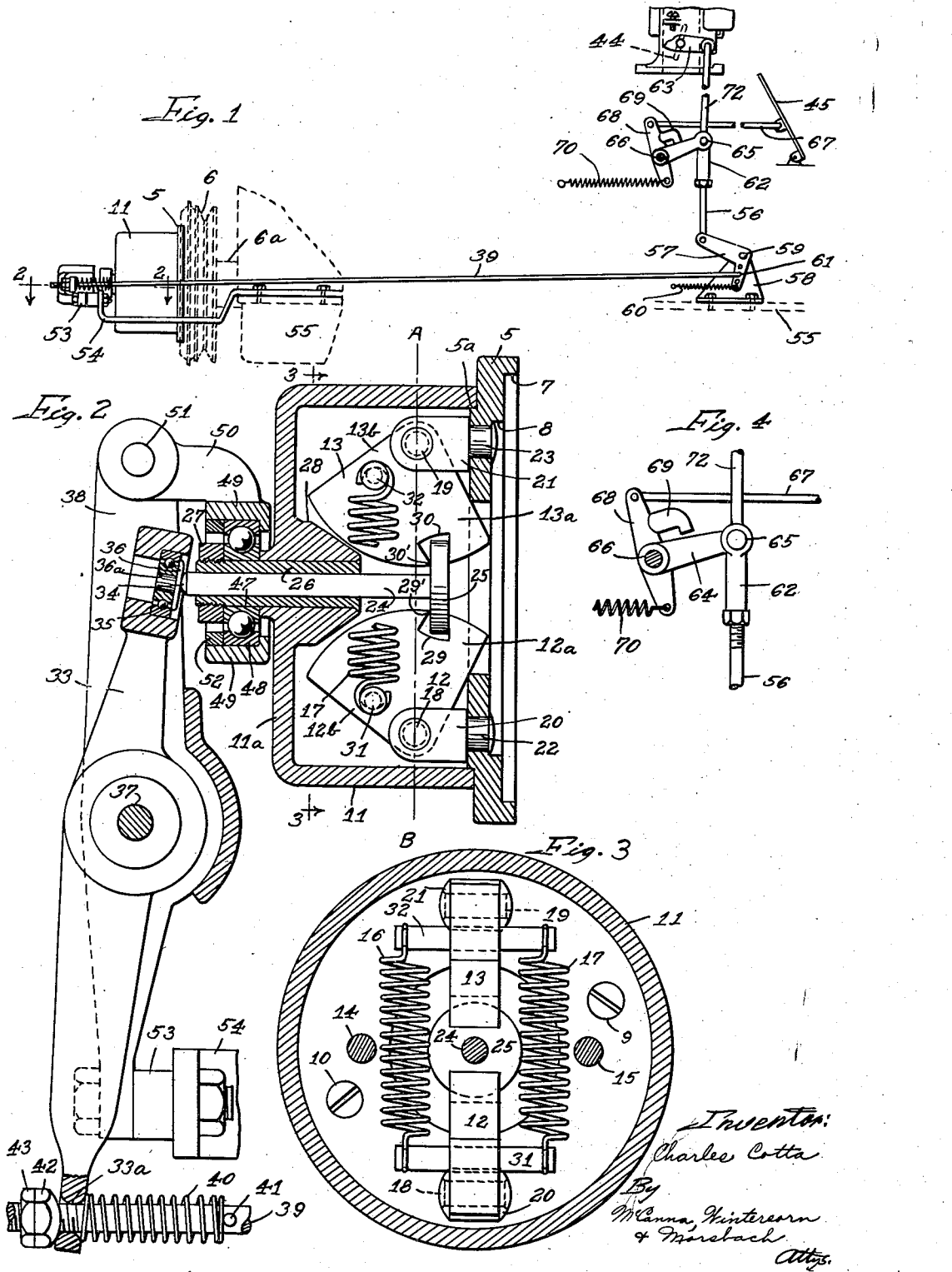
Inventor:
Charles Cotta
By McAnna, Winterorn & Morsbach
Attys.

Patented Mar. 17, 1942

2,276,467

UNITED STATES PATENT OFFICE 2,276,467

GOVERNOR

Charles Cotta, Rockford, Ill.

Application January 2, 1940, Serial No. 311,962

11 Claims. (Cl. 264—15)

This invention relates to improvements in governors for internal combustion engines or any other mechanism to be controlled at any speed, and has particular reference to that type determining the top speed of an engine or other mechanism through the operation of centrifugal flyweights.

The principal object of the invention is to provide a governor, incorporating the centrifugal flyweights, which is sufficiently sensitive in its operation to be accurately adjustable to the desired top speed. This object is accomplished by the provision of a flyweight assembly constructed so that the force counteracting the centrifugal force exerted by the rotating flyweights is not substantially exclusively provided by springs. The flyweights in my invention are so shaped and mounted that a portion of the mass in each flyweight counteracts the centrifugal force exerted by the remaining portion and thus effective governor action is delayed until the predetermined top speed is approached. When this speed is attained, the flyweights swing out and actuate the engine throttle so as to prevent any increase in speed.

Another object is to improve the governor head further by arranging the through bolts that fasten the housing to the base of the head so that they serve as limiting abutments for the counterbalancing springs to limit their outward buckling under centrifugal force, whereby to preserve specified spring characteristics and accordingly make for greater accuracy in governing function.

A further object of the invention is to provide a positive acting governor, the head of which is designed suitable for mounting on the balancer pulley on the end of the crank shaft or to some other pulley operating off the fan belt on a motor vehicle.

In the accompanying drawing:

Figure 1 is a side elevation of the governor unit as it is installed;

Fig. 2 is a horizontal section on the line 2—2 of Fig. 1 on a larger scale;

Fig. 3 is a vertical cross-section on the line 3—3 of Fig. 2; and

Fig. 4 is an enlarged view of a portion of Fig. 1.

The same reference numerals are applied to corresponding parts throughout the views.

The base plate 5 of the governor head is suitable for attachment to either the balancer pulley 6 located on the front end of the engine crank shaft 6a or to some other synchronously driven pulley or other part associated with the engine driven by a fan belt or in any other way. Counterbores 7, 8 in the base plate fit onto corresponding circular shoulders on the pulley 6 and serve to keep the base plate centered with respect to the pulley axis. Screws 9, 10 are inserted through holes in the base plate into threaded holes in the pulley 6 thereby securing the plate to the pulley. The housing 11 which encloses the flyweights 12, 13 and their correlated mechanism is mounted on the base plate 5 and accurately centered by the annular shoulder 5a concentric with the plate 5. Bolts 14, 15 inserted through suitably spaced holes in the end wall 11a of the housing and entered in threaded holes in the base plate fasten the housing in place. As will soon appear, this spacing of the bolts 14—15 on opposite sides of the springs 16—17 contributes toward accuracy in the operation of the governor, by limiting outward buckling of the springs under centrifugal force. The flyweights 12—13 are in the form of segmental or triangular-shaped plates, as shown, and are disposed in a common plane with their apex portions remote from one another. The weights are pivotally mounted on cross-pins 18—19 entered through the apex portions of said weights and carried on studs 20—21 projecting from the base plate 5, these studs being secured to the base plate 5 by the upsetting of their reduced end portions 22, 23 which are entered in holes in said plate.

A pin 24 having a circular head 25 slides in a sleeve 26 which is mounted in the enlarged center portion 28 of the end wall 11a of the housing 11 and carries a nut 27 whose purpose will be described later. The enlargement at 28 gives rigidity to the sleeve 26 and permits use of a longer sleeve for better guiding of the pin 24. The rim of the head 25 engages in radial slots in the flyweights 12—13, as at 29—30. The slots 29—30 flare inwardly, as shown, so that line contact fulcrums are provided at 29' and 30' for a low friction sliding connection. Because of the circular form of head 25, engagement is maintained with the flyweights regardless of any rotation of the pin 24 within the sleeve 26. The tension springs 16—17 have their hooked ends shown as fitted in grooves in the ends of parallel cross-pins 31—32 which are mounted in the flyweights 12—13, whereby to counteract the outward movement of the flyweights under centrifugal force, but, of course, any other suitable method of fastening may be employed for the springs. The outward movement of the flyweights is positively limited by engagement of the head 25 with the end of the bearing sleeve 26, the flyweights under those conditions being held against further movement by virtue of the engagement of the head 25 in the radial slots 29 and 30. The springs 16 and 17 in such outward movement of the flyweights undergo very little elongation, due to the fact that the cross-pins 31—32 are located so close to the pivots 18—19. The small elongation of the springs is desirable from the standpoint of more accurate speed regulation, and, incidentally, since the springs work on such short radii relative to the pivots, they accordingly have only slight lateral movement in the movement of the flyweights from one extreme position to the other, and, hence, a more compact construction is made possible. Compactness is a very important advantage, particularly in the automotive applications of the governor, due to the small space usually available for the application of such devices. The unique design and mounting of the flyweights so that a large portion of their mass remains on the negative side of the axis A—B when the engine is operating below the critical speed results in these smaller portions 12a—13a of the flyweights acting as counterweights with respect to the larger portions 12b—13b on the positive side of the axis A—B.

In operation, it is not until the critical speed is approached that the flyweights begin their radial or outward movement and operate the carburetor throttle, as hereinafter described. At the critical speed, those portions 12a—13a of the flyweights which were previously on the negative side of the axis A—B are moved outward because their counteracting force as well as that of the springs 16, 17 has been overcome through the superior force exerted by those portions 12b, 13b of the flyweights on the positive side of the axis A—B. Where the operation of centrifugally actuated flyweights is retarded in the manner described, governor action accurate within a low percentage of the speed setting is possible. Normal driving conditions are preserved at speeds below the critical stage when this governor is used since full acceleration and complete throttle control is reserved to the driver until the predetermined top speed of the engine is attained. The bolts 14, 15 securing the housing to the base plate 5 also contribute to the accuracy of this governor by maintaining substantially straight line pull of tension springs 16, 17 under all operating conditions by limiting their buckling outward under centrifugal force.

The flyweights in their outward or inward movement actuate sliding pin 24 in a horizontal direction and pressure on the rocker arm 33 is accordingly exerted or released, the pin having a rounded end 34 for point contact with the arm 33. To avoid wear at the point of contact, the rocker arm 33 is constructed for the reception of a ball bearing 35 on which a spinner plate 36 is mounted by its reduced shank 36a. This spinner plate 36 turns with the rotation of the pin 24 when it is in contact therewith.

The rocker arm 33 is pivoted at 37 on a parallel support 38 and engages a push rod 39 which is inserted through the hole 33a in the end of the rocker arm. Outward movement of the pin 24 is transmitted by the rocker arm 33 to the push rod 39 through a compression spring 40 confined on the push rod by a cross-pin 41. The compression spring 40 provides a yielding link connection for relieving excessive strains to which the linkage system actuated by the governor would otherwise be subjected under extreme conditions, such as travelling down a steep hill while using the engine as a brake, in which the engine may be caused to turn at a speed exceeding the predetermined top speed for which the governor is set. Adjustment of a round faced adjusting nut 42 on the threaded end of push rod 39 provides a speed adjustment for the governor. When the throttle approaches open position and the engine speed is being stepped up but is at a point below critical speed, as illustrated in Fig. 2, tightening of the adjusting nut 42 and locking nut 43 will create a clearance between the end of the pin 24 and the rocker arm spinner plate 36 so that contact between them will occur at a higher speed than that for which the governor was previously set. By virtue of the improved linkage arrangement herein disclosed, this contact prevents any further increase in the opening of the carburetor butterfly valve 44 after the predetermined terminal speed is attained regardless of further depression of the foot throttle 45.

The support 38 not only provides the means for the pivotal arrangement of the rocker arm 33, as has been mentioned, but it also constitutes a support for a ball bearing 46 on the governor head. The inner race 47 of this bearing is pressed over the outer end of the sleeve 26 while the outer race 48 is contained within recessed end 49 of an elbow member 50 pivoted to the end of the support 38 as at 51. Attachment of the nut 27 to the threaded portion of sleeve 26 retains the inner race 47 of the bearing 46 in place. The outer race 48 of the bearing 46 is held in place by a ring 52. The pivotal mounting of elbow 50 on support 38 at 51 keeps the governor head mechanism in the same relationship to the linkage operated by the pin 24 regardless of end-play of the shaft or pulley or other part with which the head turns, thus insuring accuracy of governing. At the other end, support 38 is bolted to a pad member 53 which is attached to bracket 54, that in turn is adapted to be secured to the crank case 55 of the engine. It should be clear that this governor is suitable for attachment to the balancer pulley mounted on the end of the crank shaft. By virtue of the support arrangement disclosed in which the rocker arm 33 is pivotally mounted on and is parallel to support 38, the end-play in the crank shaft or in any other shaft or part on which the governor unit is mounted does not appreciably impair the sensitivity of the governor. End-play of the crank shaft transmitted through the pulley to the governor head will be also transmitted to support 38 by means of the bearing in elbow 50, and such movement transmitted to support 38 will accordingly change the pivot 37 for the rocker arm 33 instead of causing movement of the push rod 39.

The push rod 39 is operatively connected with the foot throttle and the carburetor butterfly valve 44 in the following manner: The end of push rod 39 and link 56 are pivotally connected with their respective parts of a bell crank lever 57 which is pivoted on a support 58 on a suitable engine part, such as the crankcase 55, at 59. A tension spring 60 suitably secured at one end is attached at its other end in one of the several adjustment holes 61 in the bell crank lever 57. Link 56 is adjustably threadedly connected in the hollow end of rod 62 which provides an additional terminal speed adjustment. The rod 62 is pivotally connected at 65 with a link 72 which in turn is attached to the carburetor butterfly control lever 63. A link 64 is also pivotally connected to rod 62 and link 72 at 65 and is mounted on the fixed pivot 66. As the foot throttle 45 is depressed for acceleration, connecting rod 67 actuates a rocker arm 68 against action of spring 70 so that a lug 69 on the rocker arm is moved away from the link 64 and allows the butterfly valve 44 to be opened under action of spring 60. The maximum opening of the carburetor butterfly valve is regulated by the linkage between the governor and the bell crank lever 57 independently of further depression of the foot throttle 45, as illustrated in Fig. 4. When the predetermined terminal speed is attained and the pin 24 is accordingly extended from the governor head, the push rod 39 is prevented from moving in response to throttle pedal depression through contact of the rocker arm 33 with the end of the pin 24, so that the force exerted by the tension spring 60 on the bell crank lever 57 is overcome and any further foot throttle opening of the carburetor butterfly valve is prevented. When the foot throttle 45 is released, the desired reduced or idling speed is obtained by the tension spring 70 acting through rocker arm 68 and lug 69 against link 64 in such a manner as to exert sufficient force to overcome that exerted by the lighter tension spring 60 on bell crank lever 57 and attached carburetor butterfly valve linkage.

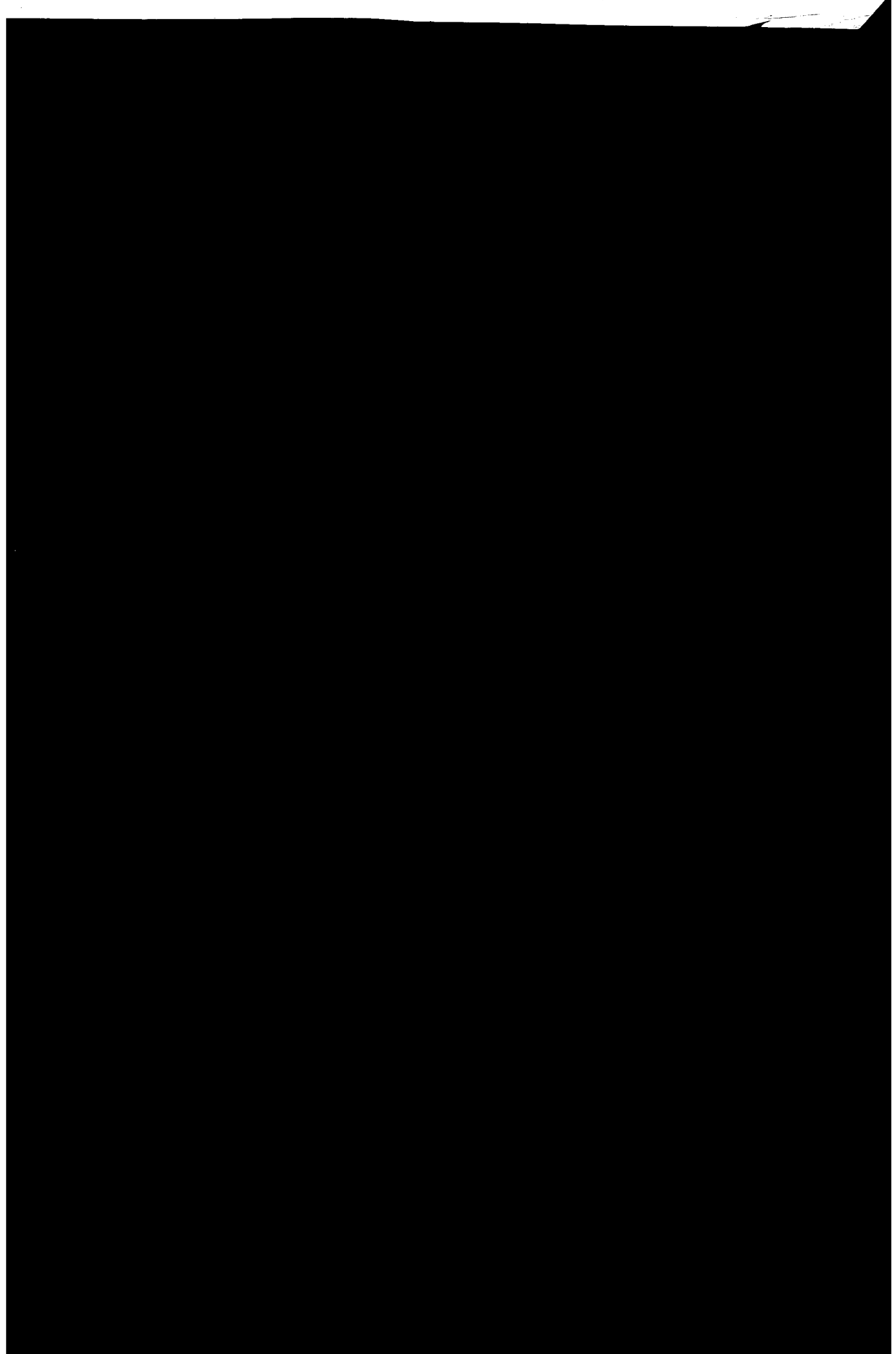

I claim:

1. A governor comprising a rotatable support adapted to be turned at a speed proportionate to the speed of the mechanism to be governed, a pair of segmental-shaped fly-weights pivotally mounted on parallel axes on said support by their apex portions and normally projecting toward each other so that an appreciable fraction, but less than half of the mass of each weight, is on the negative side of a plane through the pivot axes, spring means resisting pivotal movement of said weights outwardly relative to one another under centrifugal force, said weights having slots provided in their adjoining arcuate end portions extending substantially radially inwardly from said ends, and a member reciprocable between the arcuate end portions of said weights and having a cross-portion engaged in said slots whereby said member is adapted to be operated by movement of said weights to control the operation of the mechanism, the cross-portion of the reciprocable member comprising a generally cylindrical head, said member being both reciprocable and rotatable, and the slots in said weights being flared inwardly toward the pivots for said weights to provide operating clearances on opposite sides of the head in said slots while providing line contact fulcrum engagement between the head and the weights at the outer ends of said slots.

2. A governor comprising a rotatable support adapted to be turned at a speed proportionate to the speed of the mechanism to be governed, a pair of segmental-shaped fly-weights pivotally mounted on parallel axes on said support by their apex portions and normally projecting toward each other so that an appreciable fraction, but less than half of the mass of each weight, is on the negative side of a plane through the pivot axes, spring means resisting pivotal movement of said weights outwardly relative to one another under centrifugal force, said weights having slots provided in their adjoining arcuate end portions extending substantially radially inwardly from said ends, and a member reciprocable between the arcuate end portions of said weights and having a cross-portion engaged in said slots whereby said member is adapted to be operated by movement of said weights to control the operation of the mechanism, the slots in said weights being flared inwardly toward the pivots for said weights to provide operating clearances on opposite sides of the transverse portion in said slots while providing line contact fulcrum engagement between the transverse portion and the weights at the outer ends of said slots.

3. A governor comprising a rotatable support adapted to be turned at a speed proportionate to the speed of the mechanism to be governed, a pair of segmental-shaped fly-weights pivotally mounted on parallel axes on said support by their apex portions and projecting toward each other, spring means resisting pivotal movement of said weights outwardly relative to one another under centrifugal force, said weights having slots provided in their adjoining arcuate end portions extending substantially radially inwardly from said ends, and a member reciprocable between the arcuate end portions of said weights and having a cross-portion engaged in said slots whereby said member is adapted to be operated by movement of said weights to control the operation of the mechanism, the cross-portion of the reciprocable member comprising a generally cylindrical head, said member being both reciprocable and rotatable, and the slots in said weights being flared inwardly toward the pivots for said weights to provide operating clearances on opposite sides of the head in said slots while providing line contact fulcrum engagement between the head and the weights at the outer ends of said slots.

4. A governor comprising a rotatable support adapted to be turned at a speed proportionate to the speed of the mechanism to be governed, a pair of segmental-shaped fly-weights pivotally mounted on parallel axes on said support by their apex portions and projecting toward each other, spring means resisting pivotal movement of said weights outwardly relative to one another under centrifugal force, said weights having slots provided in their adjoining arcuate end portions extending substantially radially inwardly from said ends, and a member reciprocable between the arcuate end portions of said weights and having a cross-portion engaged in said slots whereby said member is adapted to be operated by movement of said weights to control the operation of the mechanism, the slots in said weights being flared inwardly toward the pivots for said weights to provide operating clearances on opposite sides of the transverse portion in said slots while providing line contact fulcrum engagement between the transverse portion and the weights at the outer ends of said slots.

5. A governor comprising a rotatable support adapted to be turned at a speed proportionate to the speed of a mechanism to be governed, a pair of fly-weights pivotally mounted on parallel axes on said support, coiled tension springs disposed in approximate parallelism on opposite sides of the fly-weights and connected at their opposite ends to said fly-weights to resist pivotal movement of said weights outwardly relative to one another under centrifugal force in the rotation of said support, substantially parallel abutments disposed on opposite sides of the fly-weights and springs in closely spaced relation to the mid-portions of said springs to limit outward buckling of the springs under centrifugal force, and means arranged to be operated by movement of said